Figure 1:
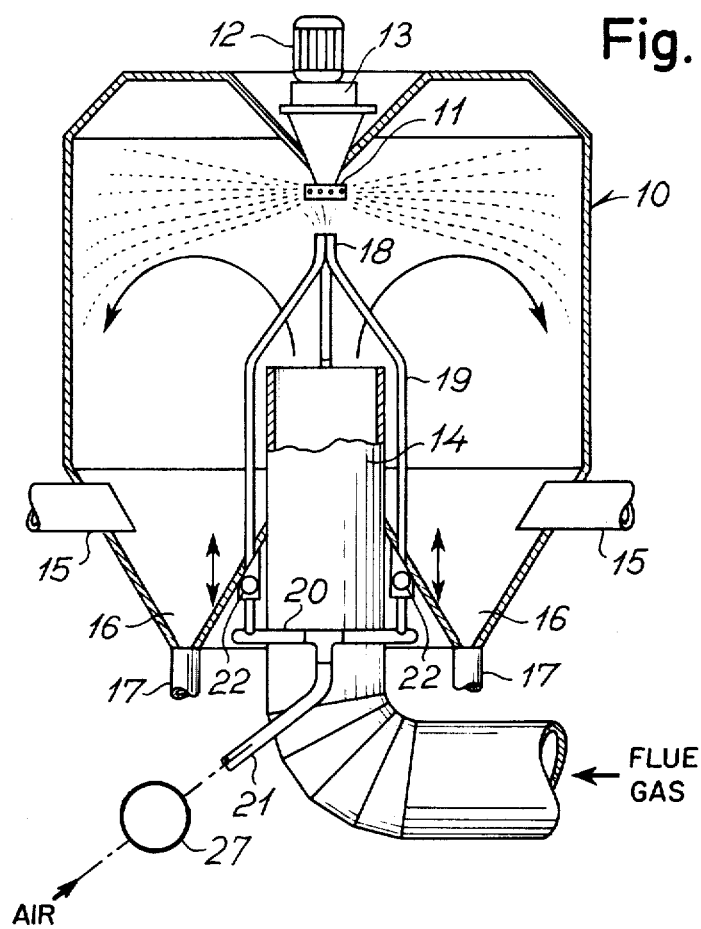
Figure 2:
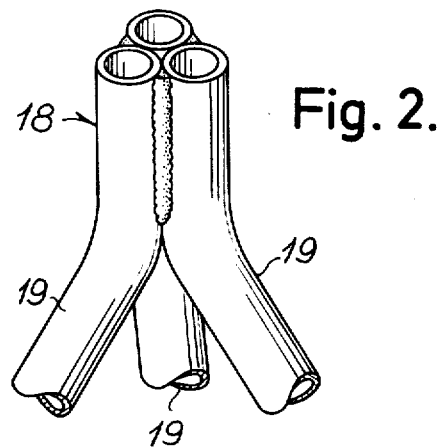
Figure 3:
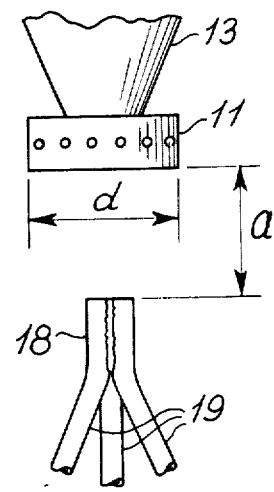
Figure 4:
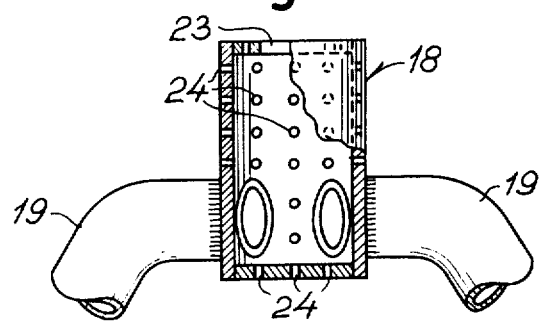
Figure 5:
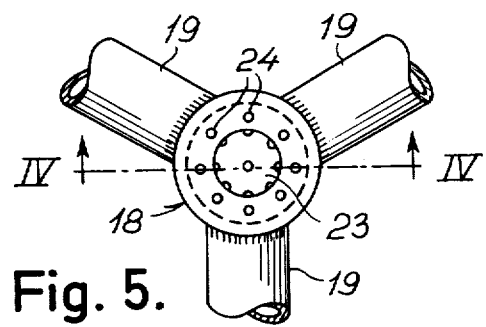

United States Patent [19]

Solver

[11] 4,369,091

[45] Jan. 18, 1983

[54] METHOD AND APPARATUS FOR DRYING A LIQUID PRODUCT

[75] Inventor: Peter E. Sølver, Virum, Denmark

[73] Assignee: A/S Niro Atomizer, Soborg, Denmark

[21] Appl. No.: 229,570

[22] PCT Filed: May 22, 1980

[86] PCT No.: PCT/DK80/00030

§ 371 Date: Jan. 22, 1981

§ 102(e) Date: Jan. 15, 1981

[30] Foreign Application Priority Data

May 22, 1979 [DK] Denmark .................. 2106/79

[51] Int. Cl.³ .................................. B01D 1/16
[52] U.S. Cl. ........................ 159/4 CC; 159/45; 159/4 A; 159/48.1
[58] Field of Search ............ 159/4 CC, 4 S, 4 R, 159/4 A, 4 C, 48 R, 16 R, 48 L

[56] References Cited

U.S. PATENT DOCUMENTS 2,475,984  7/1949  Owen ........................ 159/4 CC
3,460,600  8/1969  De Boer ........................ 159/4 S
3,828,837  8/1974  Damgaard-Iversen et al. ....... 159/4 CC

FOREIGN PATENT DOCUMENTS 856813  8/1940  France ........................ 159/4 CC
139602  3/1953  Sweden .

Primary Examiner—Norman Yudkoff
Attorney, Agent, or Firm—Dennison, Meserole, Pollack & Scheiner

[57] ABSTRACT

A spray drying apparatus with a drying chamber (10) in which a liquid product is atomized by means of an atomizing wheel (11) and dried by means of warm drying gas or flue gas introduced through a tube (14) which is directed towards the bottom side of the atomizing wheel. In order to avoid adherence of particulate material present within the drying chamber (10) to the bottom side of the atomizing wheel (11) clearing or obstructing gas, preferably atmospheric air, is blown upwardly towards the bottom side of the atomizing wheel from a clearing gas inlet (18).

6 Claims, 6 Drawing Figures

METHOD AND APPARATUS FOR DRYING A LIQUID PRODUCT

The invention relates to a method of spray drying a liquid product which is atomized in a drying chamber by means of a rotating atomizing wheel, a flow of warm drying gas being simultaneously directed towards the bottom side of the atomizing wheel from a first position located at a substantial distance below the same, in the presence of particulate solid material which under the present conditions tends to melt or become sticky in another way.

DESCRIPTION OF THE PRIOR ART

Applicants' U.S. Pat. No. 4,002,524 describes such a spray drying method, wherein the warm drying gas in the form of flue gas is caused to flow into the drying chamber through a gas supply tube arranged centrally therein and opening below the atomizing wheel, and the said patent also describes spray drying processes, wherein particulate material is introduced into the flue gas supply tube and is carried along with the warm flue gas.

It has been found that serious problems may arise in connection with such spray drying process, because particles which are present in the spray drying chamber and which have normally, but not necessarily, been introduced therein together with the drying gas, adhere to the atomizing wheel when due to the flow conditions prevailing in the drying chamber they come into contact with the bottom side of the atomizing wheel towards which the inflowing drying gas is directed. When deposits formed on the rotating atomizing wheel have reached a certain thickness the centrifugal forces acting thereon have become so great that the deposits are suddenly severed and flung outwardly against the walls of the drying chamber which at best are thereby subjected to a strong influence of wear and at worst damaged by the influence of impact. Such a severance of deposits from the rotating atomizing wheel may also cause that deposits remaining on the atomizing wheels give rise to an unbalance which may cause so serious vibrations that a permanent deflection or fracture of the spindle of the atomizing wheel occurs.

SUMMARY OF THE INVENTION

In order to solve these problems the present invention provides a method of spray drying a liquid product, said method comprising atomizing said liquid product in a spray drying chamber by means of a rotating atomizing wheel, directing from a first position below said atomizing wheel and spaced substantially therefrom a flow of hot drying gas towards the bottom side of said wheel in the presence of particulate solid matter tending to become sticky under the temperature conditions present, and simultaneously directing from a second position below the bottom side of said atomizing wheel, but substantially closer thereto than said first position, a flow of clearing or obstructing gas free of such solid matter so as to prevent said particulate solid matter from contacting said bottom side of the atomizing wheel.

The clearing or obstructing gas may be of any type provided that it does not contain particles which may adhere to the atomizing wheel. Thus, in principle it would be possible to use filtered gas from the drying chamber as clearing gas. However, it may be advantageous to use clearing gas, preferably atmospheric air, which is substantially colder than the drying gas because the clearing gas will then also cool the bottom side of the atomizing wheel and thereby contribute not only to increase the useful life of the wheel, but also to reduce the risk that particles which happen to come into contact therewith, adhere thereto.

The clearing or obstructing gas may be directed towards the bottom side of the atomizing wheel in any manner which substantially reduces the risk that particles of material floating in the air or gas in the drying chamber come into contact with the atomizing wheel. However, normally it is desired to limit the consumption of clearing gas to the smallest possible amount, with means to apply the clearing gas so that it becomes as effective as possible. Thus, the flow of clearing gas may be directed axially and centrally towards the atomizing wheel. When such axial flow of clearing or obstructing gas hits the central portion of the atomizing wheel the clearing gas will be deflected radially outwardly in all directions and thereby effectively isolate the bottom side of the atomizing wheel from the other gas within the drying chamber.

As mentioned above it is normally desired to keep the consumption of clearing or obstructing gas as small as possible. Experiments have shown that it is convenient to supply clearing or obstructing gas amounting to 0.5–5 percentage by weight of the amount of drying gas being supplied to the drying chamber when the clearing gas is introduced into the drying chamber at a rate of 15–40 m/sec.

The invention also provides a spray drying apparatus comprising a drying chamber, a rotary atomizing wheel arranged in the upper part of said drying chamber, an inlet tube for drying gas opening into said drying chamber at a first position below said atomizing wheel and spaced substantially therefrom, said inlet tube being directed towards the bottom side of said wheel, and an inlet communicating with a source of clearing or obstructing gas free of solid matter, said clearing gas inlet being also directed towards the bottom side of said atomizing wheel and opening into the drying chamber at a second position located substantially closer to said bottom side of the atomizing wheel than said first position.

As mentioned previously, the clearing or obstructing gas may, for example, be directed centrally and axially towards the bottom side of the atomizing wheel, and in that case the clearing gas inlet may extend axially through the drying gas inlet tube. However, in such a structure problems may arise due to the high temperature to which the clearing gas inlet is heated by the drying gas and, furthermore, such structure renders it impossible to obtain a temperature of the clearing gas being substantially lower than the temperature of the drying gas which, as mentioned above, would reduce the risk of formation of deposits on the atomizing wheel. For the said reasons the clearing gas inlet may conveniently be connected to a plurality of clearing gas supply tubes which are arranged around and extend along the drying gas supply tube. In that case the clearing gas supply tubes are not subjected to any extreme heating. The clearing or obstructing gas supply tubes may be positioned with uniform angular spacings around the drying gas supply tube, and the free ends of the clearing gas supply tubes may be connected mutually or to a common clearing gas inlet, whereby a stable structure may be obtained.

It may happen that the atomizing wheel separates from its driving mechanism so that it falls down through the drying chamber. In a preferred embodiment the clearing gas inlet comprises a plurality of tube sections each having a longitudinal axis defining an acute angle with the rotary axis of said atomizing wheel, the open upper ends of said tube sections each being positioned at a radial distance from the rotary axis of said atomizing wheel exceeding the maximum outer diameter of said wheel, and the inner diameter of said drying gas inlet tube exceeding the outer diameter of said atomizing wheel. In case the atomizing wheel drops down through the drying chamber it may pass the clearing gas tube sections and fall down into the gas inlet tube without causing any substantial damage.

BRIEF DESCRIPTION OF THE DRAWINGS

The invention will now be further described with reference to the drawings, wherein FIG. 1 is a side view and partially sectional view of an embodiment of a spray drying system according to the invention, FIG. 2 is a perspective view of the upper end of the clearing or obstructing gas supply tubes of FIG. 1 shown in an enlarged scale, FIG. 3 is a side view of the atomizing wheel and the upper ends of the clearing or obstructing gas supply tubes, FIG. 4 is a sectional view along the line IV—IV in FIG. 5 of a second embodiment of the obstructing gas inlet shown in an enlarged scale, FIG. 5 is a plan view of the clearing or obstructing gas inlet shown in FIG. 4, and FIG. 6 is a side view and partially sectional view of a third embodiment of the clearing gas inlet.

DESCRIPTION OF PREFERRED EMBODIMENTS

The spray drying apparatus shown in FIG. 1 comprises a drying chamber 10 having arranged in its upper part an atomizing wheel 11 which may be rotated by an electric motor 12, and which belongs to an atomizing machine 13. A liquid product to be dried is supplied to the atomizing machine and the atomizing wheel via a product supply tube, not shown. Flue gas or another drying gas may be supplied to the drying chamber 10 through a drying gas supply tube 14 extending centrally into the drying chamber 10 and having its opening positioned a certain distance below the atomizing wheel 11. The consumed drying gas is discharged from the drying chamber 10 through drying gas discharge tubes 15, and finished dried product is collected in a lower funnel-shaped part 16 of the drying chamber 10 and may be passed from the chamber through a product outlet 17. To the extent described up till now the spray drying apparatus is well known and operates in a known manner.

The flow of drying gas which normally has a temperature exceeding 400°-450° C. and possibly even 1000° C., is introduced into the drying chamber 10 through the tube 14 and will heat the bottom side of the atomizing wheel 11. When the liquid product, which is atomized by the atomizing wheel 11 and spray dried within the chamber 10, contains solid matter, for example ore concentrate, some of the solid particles become sticky, probably because they melt completely or partly. In this sticky condition the particles tend to adhere to the wall parts with which they come into contact. Consequently, substantial deposits will form relatively rapidly on the warm bottom side of the atomizing wheel 11. As the thickness of these deposits increases the centrifugal forces by which they are influenced will also increase and finally reach such a value that the deposits are suddenly torn off. As previously explained, this may have rather serious consequences. In some cases the drying gas flowing through the supply tube 14 also contains particulate solid matter, which may possibly be directly supplied to the drying gas and which may, for example, be a flux for a mineral being dried in the apparatus.

In order to prevent the said deposits at the bottom side of the atomizing wheel 11 an inlet 18 for clearing or obstructing gas is positioned immediately below said wheel. In the embodiment shown in FIGS. 1 and 2 this clearing gas inlet is formed by the free ends (vide FIG. 2) of three clearing gas supply tubes 19 extending along and arranged around the drying gas supply tube 14 with uniform angular spacings. The free ends of the tubes 19 may, for example, be welded together. At their bottom ends these clearing gas supply tubes 19 are communicating with an annular distributing tube 20 surrounding the drying gas supply tube 14 outside the drying chamber 10, and to which atmospheric air or another gas is supplied via a supply tube 21, for example by means of a blower 27 as indicated in FIG. 1. As indicated by arrows the length of the individual supply tubes 19 may be adjusted separately by means of length adjusting means 22 comprising telescopic tube parts which may be locked together by means of releaseable locking means. By these adjusting means 22 the obstructing gas inlet 18 may be centered and its spacing from the bottom side of the atomizing wheel 11 may be adjusted.

When the spray drying apparatus is operating clearing or obstructing gas, such as atmospheric air, is blown through the clearing gas inlet 18 centrally upwardly towards the bottom side of the atomizing wheel 11, and the clearing gas then flows radially outwardly in all directions. This flow of clearing gas causes that the bottom side of the atomizing wheel is isolated from the other gas in the chamber 10 containing solid matter and that the bottom side of the atomizing wheel is cooled, which may contribute to increasing the effective useful life of the atomizing wheel.

The vertical distance "a" between the bottom side of the atomizing wheel 11 and the clearing gas inlet 18 (vide FIG. 3) is conveniently chosen in depency of the diameter "d" of the atomizing wheel 11, and preferably so that "a" is within the range 0.2d-1.0d. It is normally desired to maintain the volume of drying gas blown into the drying chamber 10 as small as possible retaining the desired obstructing or clearing effect. It has been found that if the obstructing air is blown into the chamber 10 through the inlet 18 at a velocity of 15-40 m/sec., it is suitable to use an amount of clearing or obstructing gas amounting to 0.5-5 percentage by weight of the amount of drying gas supplied to the chamber through the supply tube 14.

FIGS. 4 and 5 show a second embodiment of the clearing or obstructing gas inlet formed as a cylindrical chamber defining a discharge opening 23 in its upper end wall. The said chamber communicates with the supply tubes 19 extending through the peripheral wall of the chamber. The walls of the cylindrical chamber is further provided with uniformly distributed perforations 24. During operation of the spray drying apparatus the main part of the clearing or obstructing air will flow through the discharge opening 23 upwardly towards the bottom side of the atomizing wheel 11, but part of the clearing gas or air will flow out through the perforations 24, whereby it is prevented that substantial deposits are formed on the outer side of the cylindrical clearing gas inlet 18.

Figure 6:
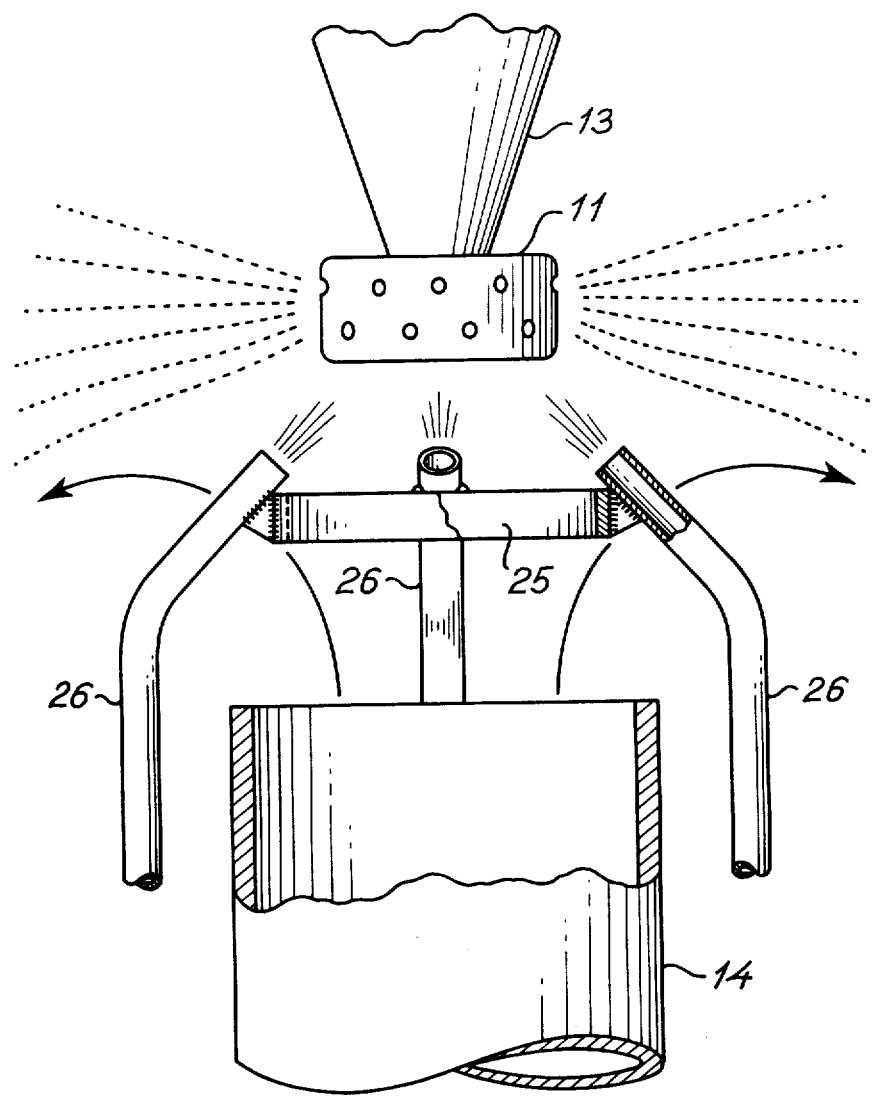

FIG. 6 shows a presently preferred third embodiment of the clearing or obstructing gas inlet. This gas inlet comprises a plurality—preferably three or four—of clearing gas supply tubes 26 having free upper end portions each of which defines an acute angle which the rotational axis of the atomizing wheel 11 and being directed towards the central part of the bottom side of the wheel 11. The upper ends of the supply tubes 26 are connected to a connecting ring 25, for example by welding, and the inner diameter of the drying gas supply tube as well as of the connecting ring 15 exceeds the maximum outer diameter of the atomizing wheel 11. If for some reason the atomizing wheel 11 should disengage itself from the atomizing machine 13 it may fall down through the connecting ring 15 and through the drying gas supply tube 14 without any interference with the clearing gas supply tubes 26 and without causing any substantial damage.

The advantageous effect which is obtained by the method and the apparatus according to the invention is illustrated more in detail by the following example.

EXAMPLE

A spray drying apparatus substantially as shown in FIG. 1, but without any clearing gas inlet, was used for drying sulphidic copper-nickel ore concentrate. The drying chamber 10 of the apparatus had a diameter of 10 meters. The atomizing wheel 11 had a diameter of 280 mm and rotated at a velocity of 7200 rpm. About 57,000 kg/h ore concentrate was supplied to the atomizing wheel. Drying gas was supplied to the drying chamber through the central tube 14 in an amount of 65,000 kg/h at a temperature of 1000° C.

Interruptions of operation frequently occurred because deposits burned on the atomizing wheel 11 and from time to time these deposits were flung off and caused an excessive wear of the wall of the drying chamber as well as damage of the atomizing machine due to the vibrations resulting from the deposits.

The system was modified so that it was brought in agreement with the present invention, namely by installing three obstructing gas supply tubes 19 with an inner diameter of about 2 inches and forming an obstructing gas inlet 18 as that shown in FIG. 2. Thus, the tubes opened in a bundle below the atomizing wheel at a distance of 100 mm below the same. Atmospheric air was supplied through the tubes 19 in an amount of about 700 kg/h so that the velocity of the air at the obstructing gas inlet 18 was about 25 m/sec.

After this modification of the system it is was in operation for one year without interruptions of operation due to deposits on the atomizing wheel.

While the invention has been described in detail in connection with specific embodiments it should be understood that various modifications of these embodiments could be made within the scope of the appended claims.

I claim:

1. A method of spray drying a liquid product, said method comprising:

atomizing said liquid product in a drying chamber by means of a rotating atomizing wheel, directing from a first position below said atomizing wheel and spaced substantially therefrom a flow of hot drying gas substantially coaxially with the atomizing wheel, wherein there is present in said drying chamber particulate solid matter having a tendency to become sticky under the temperature conditions within said drying chamber, and simultaneously directing a flow of clearing gas, which is atmospheric air and substantially colder than the drying gas and free of said particulate solid matter, from a clearing gas inlet positioned above said first hot drying gas directing inlet tube position such that the vertical distance between the clearing gas inlet and the bottom side of the atomizing wheel is 0.2×d–1.0×d, where "d" is the outer diameter of said atomizing wheel, and wherein the flow of clearing gas is 0.5–5 percentage by weight of the amount of drying gas supplied to said drying chamber, when said clearing gas is supplied into the drying chamber at a rate of 15–40 m/sec so as to prevent said particulate solid matter from contacting said bottom side of the atomizing wheel.

2. A spray drying apparatus comprising:

a drying chamber, a rotary atomizing wheel having a bottom side arranged in the upper part of said drying chamber, an inlet tube for a hot drying gas opening into said drying chamber at a first position below said atomizing wheel and spaced substantially therefrom, and arranged coaxially with the rotary axis of said atomizing wheel, said inlet tube being directed towards the bottom side of said wheel such that the flow of hot drying gas to be introduced is directed substantially coaxially with the atomizing wheel, and means comprising a clearing gas inlet adapted for simultaneously directing a flow of clearing gas, which is atmospheric air and substantially colder than the drying gas and free of said particulate solid matter, said clearing gas inlet being positioned above said first hot drying gas directing inlet tube position, the vertical distance between the clearing gas inlet and the bottom side of the atomizing wheel being 0.2×d–1.0×d where "d" is the outer diameter of said atomizing wheel, and said clearing gas inlet means including means for establishing a flow of clearing gas at 0.5–5 percentage by weight of the amount of drying gas supplied to said drying chamber, when said clearing gas is supplied into the drying chamber at a rate of 15–40 m/sec so as to prevent said particulate solid matter from contacting said bottom side of the atomizing wheel.

3. An apparatus according to claim 2, wherein said source of clearing gas comprises a blower for supplying atmospheric air to said clearing gas inlet.

4. An apparatus according to claim 2, wherein said clearing gas inlet is arranged symmetrically in relation to the rotary axis of said atomizing wheel.

5. A spray drying apparatus comprising:

a drying chamber, a rotary atomizing wheel arranged in the upper part of said drying chamber, an inlet tube for a hot drying gas opening into said drying chamber at a first position below said atomizing wheel and spaced substantially therefrom, said inlet tube being directed towards the bottom side of said wheel such that the flow of hot drying gas is directed substantially coaxially with the atomizing wheel, and an inlet communicating with a source of clearing gas free of solid matter and substantially colder than the drying gas, said clearing gas inlet being also directed towards the bottom side of said atomizing wheel and opening into the drying chamber at a second position substantially closer to said bottom side of the atomizing wheel than said first position, and said clearing gas inlet comprising a plurality of tube sections each having a longitudinal axis defining an acute angle with the rotary axis of said atomizing wheel, the open upper ends of said tube sections each being positioned at a radial distance from the rotary axis of said atomizing wheel exceeding the maximum outer diameter of said wheel wherein the upper ends of said tube sections are mutually connected by an annular connecting member arranged coaxially with said atomizing wheel and having an inner diameter exceeding the maximum outer diameter of said wheel, and the inner diameter of said drying gas inlet tube exceeding the outer diameter of said atomizing wheel.

6. A spray drying apparatus comprising:
a drying chamber,
a rotary atomizing wheel arranged in the upper part of said drying chamber, an inlet tube for drying gas opening into said drying chamber at a first position below said atomizing wheel and spaced substantially therefrom, said inlet tube being directed towards the bottom side of said wheel, and an inlet communicating with a source of clearing gas free of solid matter, said clearing gas inlet being also directed towards the bottom side of said atomizing wheel and opening into the drying chamber at a second position located substantially closer to said bottom side of the atomizing wheel than said first position, and wherein said clearing gas inlet comprises a plurality of tube sections each having a longitudinal axis defining an acute angle with the rotary axis of said atomizing wheel, the open upper ends of said tube sections each being positioned at a radial distance from the rotary axis of said atomizing wheel exceeding the maximum outer diameter of said wheel, and the inner diameter of said drying gas inlet tube exceeds the outer diameter of said atomizing wheel, and said clearing gas inlet is arranged symmetrically in relation to the rotary axis of said atomizing wheel.

* * * * *